UNITED STATES PATENT OFFICE.

JULIUS ROTHER, OF KATSCHER, GERMANY.

PROCESS OF MAKING DISINFECTANT-POWDER.

SPECIFICATION forming part of Letters Patent No. 701,620, dated June 3, 1902.

Application filed November 5, 1901. Serial No. 81,267. (No specimens.)

*To all whom it may concern:*

Be it known that I, JULIUS ROTHER, a subject of the Emperor of Germany, and a resident of Katscher, Upper Silesia, Germany, have invented a new and useful Improved Process of Producing a Powder from Alsol, Sublimate, Sozoiodol-Quicksilver, and Veratrine, of which the following is a description.

The present invention consists of a process for producing a powder from alsol, sublimate, sozoiodol-quicksilver, and veratrine.

In carrying out the process nine parts, by weight, of alsol (aluminium aceto-tartrate) are first dissolved in distilled water, with an addition of alcohol, only just sufficient solution being employed as is necessary to effect dissolution. To this mixture is added one-half part, by weight, of chlorid of mercury, called "sublimate," with the addition of a little common salt, also dissolved in diluted alcohol, and then one-half part, by weight, of sozoiodol-quicksilver. The latter is advantageously mixed in a dry state with the common salt, (about half the amount,) thoroughly shaken, and then a sufficient quantity of from 30° to 40° alcohol poured onto the mixture and the whole thoroughly dissolved by being warmed. For each gram of these ten parts, by weight, 0.014 grams of veratrine is added. The veratrine is also dissolved in a corresponding quantity of alcohol and then added to the mixture. Any dullness or precipitation which takes place as the whole solution cools down will disappear again immediately it is warmed again. The whole mixture is now vaporized down to a thick fluid consistency in a water-bath, which should not be too strongly heated. It is then dried in a moderate heat and suitably ground or otherwise reduced to a powder. The powder is of a light-yellowish color and somewhat hygroscopic. The powder thus obtained forms, if rubbed or ground down together with lactose in the proportion of one to five hundred, an excellent preventive and healing medium for diseases of the nose, mouth, and throat, in that it may be applied to the diseased tissues direct by means of a blower.

I claim as my invention—

A process for producing a powder from alsol, sublimate, sozoiodol-quicksilver and veratrine, which consists in adding to a weak solution of about nine parts by weight of alsol in alcohol, under the addition of common salt, an alcoholic solution of about one-half part by weight of sublimate and one-half part by weight of sozoiodol-quicksilver, then adding, for each gram of this mixture of sublimate, sozoiodol-quicksilver and alsol, an alcoholic solution of about 0.014 grams of veratrine, vaporizing the whole in a water-bath to a thick fluid consistency, drying in moderate heat, grinding to a powder and mixing with lactose in the manner and for the purpose substantially as described.

In witness whereof I have hereunto set my hand in presence of two witnesses.

JULIUS ROTHER.

Witnesses:
HERMANN BARTSCH,
ALBERT SCHENK.